United States Patent
Harumoto et al.

(10) Patent No.: US 7,355,511 B2
(45) Date of Patent: Apr. 8, 2008

(54) NOTIFICATION MANAGING APPARATUS AND NOTIFICATION MANAGING METHOD FOR VEHICLE

(75) Inventors: Satoshi Harumoto, Hyogo (JP);
Toshitaka Yamato, Hyogo (JP);
Hiroshi Takeuchi, Hyogo (JP);
Yoshihiko Maeno, Hyogo (JP);
Kazuhiro Sakiyama, Hyogo (JP)

(73) Assignee: Fujitsu Ten Limited, Kobe (JP)

( * ) Notice: Subject to any disclaimer, the term of this patent is extended or adjusted under 35 U.S.C. 154(b) by 176 days.

(21) Appl. No.: 11/135,444

(22) Filed: May 24, 2005

(65) Prior Publication Data
US 2005/0270152 A1 Dec. 8, 2005

(30) Foreign Application Priority Data
May 26, 2004 (JP) ............................. 2004-156538

(51) Int. Cl.
*B60Q 1/00* (2006.01)

(52) U.S. Cl. ............ 340/435; 340/426.13; 340/426.16; 340/426.18; 340/539.23; 340/686.1; 348/148; 382/104

(58) Field of Classification Search ................ 340/435, 340/436, 426.13, 426.17, 539.13, 539.23, 340/686.1, 426.26, 426.18; 701/45; 348/104, 348/148
See application file for complete search history.

(56) References Cited

U.S. PATENT DOCUMENTS

| 6,049,268 | A  | * | 4/2000  | Flick ........................ 340/425.5 |
| 6,320,498 | B1 | * | 11/2001 | Flick ........................ 340/426.17 |
| 6,744,364 | B2 | * | 6/2004  | Wathen .................... 340/539.1 |
| 6,760,591 | B1 | * | 7/2004  | Klinger .................... 455/456.1 |
| 6,873,257 | B2 | * | 3/2005  | Maloney et al. ....... 340/539.21 |
| 6,906,612 | B2 | * | 6/2005  | Ghabra et al. ............. 340/5.61 |

FOREIGN PATENT DOCUMENTS

| JP | A 09-141004  | 6/1997 |
| JP | A 2000-179205 | 6/2000 |
| JP | A 2004-102332 | 4/2004 |

* cited by examiner

*Primary Examiner*—Davetta W. Goins
(74) *Attorney, Agent, or Firm*—Oliff & Berridge, PLC (57) ABSTRACT

An apparatus for managing a notification from an in-vehicle device to a person to be notified includes an information acquiring unit that acquires information on the person; and a means selecting unit that selects a notification means based on the information acquired. The information includes at least a relative position of the person with respect to a vehicle.

18 Claims, 9 Drawing Sheets

| | | PRIORITIES EFFECTIVE DISTANCE> DIRECTIONALITY> IMMEDIACY> AMOUNT OF INFORMATION | | | |
|---|---|---|---|---|---|
| | | EFFECTIVE DISTANCE | DIRECTION ALITY | IMMEDIACY | AMOUNT OF INFORMATION |
| INSIDE | DISPLAY | L1 | YES | YES | LARGE |
| | SOUND | L2 | NO | YES | MEDIUM |
| | DIRECT COMMUNI-CATION | L3 | NO | NO | LARGE |
| | LIGHT | L4 | YES | YES | SMALL |
| | HORN | L5 | NO | YES | SMALL |
| | INDIRECT COMMUNI-CATION | L5 OR MORE | NO | NO | LARGE |
| OUTSIDE | DISPLAY | L0 | YES | YES | LARGE |
| | SOUND | L0 | NO | YES | MEDIUM |

FIG.4

| STATE | EFFECTS/HARMFUL EFFECTS |
|---|---|
| DAY TIME | EFFECTS OF DISPLAY/LIGHT DECREASE |
| NIGHT | EFFECTS OF DISPLAY/LIGHT INCREASE |
| NIGHT + RESIDENTIAL AREA | IT IS LIKELY THAT HORN/SOUND ARE NUISANCES TO RESIDENTS |
| TOWN AREA (SOUND OUTSIDE VEHICLE IS LARGE) | EFFECTS OF HORN/SOUND DECREASE |
| ⋮ | ⋮ |

FIG.8D ance; NOTIFICATION MANAGING APPARATUS AND NOTIFICATION MANAGING METHOD FOR VEHICLE

BACKGROUND OF THE INVENTION

1) Field of the Invention

The present invention relates to a technology for managing a notification from a vehicle to a person to be notified, depending on a situation and a content of the notification.

2) Description of the Related Art

Recently, a variety of apparatuses mounted on a vehicle causes a variety of contents of notification to a user (a vehicle user) who is one of the people to be notified. In addition, an apparatus that operates when the user is away from the vehicle, such as a remote air-conditioning-control system and a security system is being developed, which makes the notification necessary even when the user is away from the vehicle.

For example, an antitheft device for a vehicle disclosed in Japanese Patent Application No. H9-141004 watches whether a person approaches, touches, or intrudes into the vehicle, and, if any suspicious act is detected, calls a user at a telephone number stored in advance, and transmits an alarm in a sound.

Japanese Patent Application Laid-Open No. 2000-179205 discloses a technology for, at the time of completion of remote operation management of a vehicle opening and closing device by a keyless entry device, sounding a buzzer to report completion of remote control when a transponder ID can be received by a transponder communication machine and reporting completion of remote operation with blinking of a hazard lamp when the transponder ID cannot be received by the transponder communication machine.

Japanese Patent Application Laid-Open No. 2004-102332 discloses an information delivery method for storing preference information of a user and the number of times of operation in a server, which communicates with an in-vehicle terminal, to make it possible to provide information required by the user promptly.

Examples of a method with which a vehicle sends a notification to a user include a method of using a standard equipment provided in a vehicle like a lighting system, such as a head light, and a horn, a method with which an in-vehicle communication device indirectly communicates with a user via a telephone line or the Internet, and a method of installing a speaker or a display device.

Conventionally, in-vehicle devices individually select a method of notification and output the notification. For example, in Japanese Patent Application Laid-Open No. H9-141004, notification is executed via a telephone line. In Japanese Patent Application Laid-Open No. 2000-179205, notification is executed using a buzzer or a hazard lamp.

Therefore, it is impossible to select a method appropriate for situations around a user and a vehicle, and urgency of notification, and an amount of information of the notification content. It is likely that notification is not performed effectively.

SUMMARY OF THE INVENTION

It is an object of the present invention to solve at least the above problems in the conventional technology.

An apparatus according to one aspect of the present invention, which is for managing a notification from an in-vehicle device to a person to be notified, includes an information acquiring unit that acquires information on the person, the information including at least a relative position of the person with respect to a vehicle; and a means selecting unit that selects a notification means based on the information acquired.

An apparatus according to one aspect of the present invention, which is for managing a notification from an in-vehicle device to a person to be notified, includes an information acquiring unit that acquires information on the person, the information including at least a relative position of the person with respect to a vehicle; an area setting unit that sets an area within which the person can recognize the notification from the in-vehicle device; and a means selecting unit that selects, when the person is within the area, notification by the in-vehicle device, and selects, when the person is out of the area, selects notification by information transmission to a portable terminal held by the person.

An apparatus according to one aspect of the present invention, which is for managing a notification from an in-vehicle device to a person to be notified, includes an information acquiring unit that acquires information on the person, the information including at least a direction of the person with respect to a vehicle; and a means selecting unit that selects a notification means based on the direction of the person with respect to the vehicle.

A method according to one aspect of the present invention, which is for managing a notification from an in-vehicle device to a person to be notified, includes acquiring information on the person, the information including at least a relative position of the person with respect to a vehicle; and selecting a notification means based on the information acquired.

The other objects, features, and advantages of the present invention are specifically set forth in or will become apparent from the following detailed description of the invention when read in conjunction with the accompanying drawings.

BRIEF DESCRIPTION OF THE DRAWINGS

FIG. 4 is a table for explaining a change in effectiveness of notification means according to time, a situation around a vehicle, and the like;

DETAILED DESCRIPTION

Exemplary embodiments of a notification managing apparatus and a notification managing method for a vehicle according to the present invention are explained in detail below with reference to the accompanying drawings.

Figure 1:
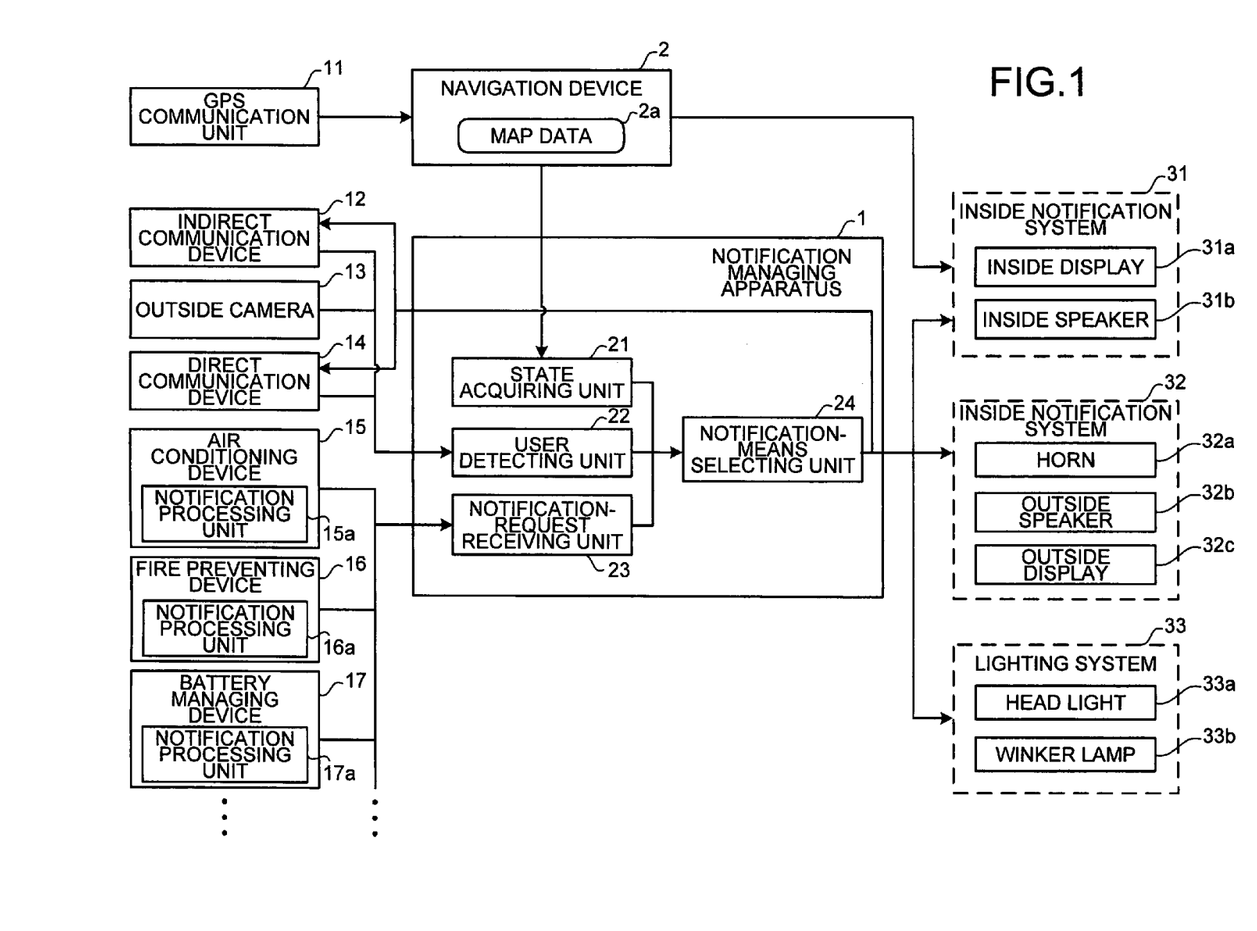
FIG. 1 is a block diagram of an in-vehicle system according to an embodiment of the present invention.

FIG. 1 is a block diagram of an in-vehicle system according to an embodiment of the present invention. A notification managing apparatus 1 is connected to a navigation device 2, an indirect communication device 12, an outside camera 13, a direct communication device 14, an air conditioning device 15, a fire preventing device, a battery managing device 17, an inside notification system 31, an outside notification system 32, a lighting system 33, and the like.

The navigation device 2 sets a traveling route of an own vehicle and guides the own vehicle. Specifically, the navigation device 2 acquires a present location of the own vehicle from a GPS communication unit 11, specifies a road on which the own vehicle is traveling using map data 2a, and executes route guidance using an inside display 31a and an inside speaker 31b included in the inside notification system 31. In addition, the navigation device 2 transmits location information of the own vehicle and time information to the notification managing apparatus 1.

The indirect communication device 12 is an indirect communication means that communicates with a portable terminal, such as a cellular phone held by a user via a telephone line and the Internet. The outside camera 13 is photographing means that photographs a situation around the own vehicle.

The direct communication device 14 is a direct communication means that communicates directly with a terminal held by the user, for example, a remote key terminal (a so-called smart entry) that remotely operates a door lock mechanism of a vehicle. Note that a terminal with which the direct communication device 14 communicates and a terminal with which the indirect communication device 12 communicates may be formed integrally and may be given other functions like a cellular phone function.

The air conditioning device 15 executes room temperature control and the like for the vehicle. The fire preventing device 16 executes detection and prevention of a fire in the vehicle. The battery managing device 17 manages a charging situation of a battery mounted on the vehicle.

The various in-vehicle devices such as the air conditioning device 15, the fire preventing device 16, and the battery managing device 17 are connected to necessary sensors and the like, respectively, to execute functions of the respective devices. In addition, the respective in-vehicle devices execute processing automatically or based on a request from a user and warn the user when necessary.

Notification processing units provided in the respective in-vehicle devices (a notification processing unit 15a in the air conditioning device 15, a notification processing unit 16a in the fire preventing device 16, the notification processing unit 17a in the battery managing device 17, etc.) judge necessity of this notification and determine urgency of the notification and a notification content.

When the respective notification processing units judge that the notification is necessary, the notification processing units transmit notification requests including the urgency and the notification content to a notification managing unit 1.

The notification managing unit 1 includes a situation acquiring unit 21, a user detecting unit 22, a notification-request receiving unit 23, and a notification-means selecting unit 24. The situation acquiring unit 21 receives the location information of the own vehicle and the time information from the navigation device 2 and outputs the location information and the time information to the notification-means selecting unit 24.

The user detecting unit 22 detects a location and a direction of the user from outputs of a proximity sensor by radar, the indirect communication device 12, the outside camera 13, and the direct communication device 14 and outputs the location and the direction of the user to the notification-means selecting unit 24. The notification-request receiving unit 23 receives notification requests from the in-vehicle devices such as the air conditioning device 15, the fire preventing device 16, and the battery managing device 17 and outputs the notification requests to the notification-means selecting unit 24.

The notification-means selecting unit 24 selects notification means based on the location information of the vehicle, the time information, a relative position of the user and the own vehicle, the direction of the user, and the urgency of the notification and the notification content. The notification-means selecting unit 24 executes notification to the user using the selected notification means.

The notification means selected by the notification-means selecting unit 24 is one or a combination of the inside display 31a and the inside speaker 31b included in the inside notification system 31, a horn 32a, an outside speaker 32b, and an outside display 32c included in the outside notification system 32, a head light 33a and a winker lamp 33b of the lighting system 33, the indirect communication device 12, and the direct communication device 14.

Figure 2:
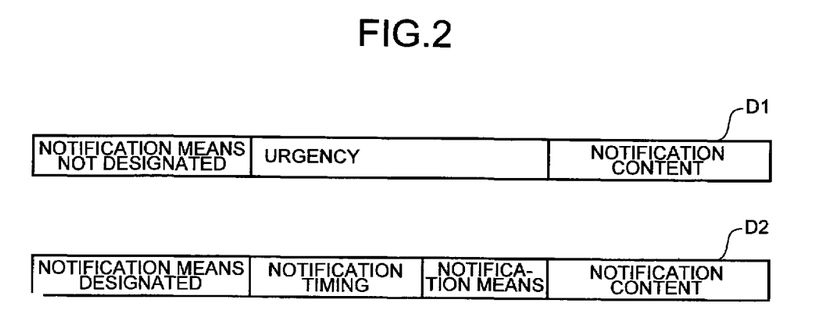
FIG. 2 is a schematic for explaining a specific example of a notification request transmitted by a notification processing unit shown in FIG. 1.

FIG. 2 is a schematic for explaining a specific example of a notification request transmitted by a notification processing unit shown in FIG. 1. The notification request D1 has items "notification means not designated", "urgency", and "notification content".

The item "notification means not designated" indicates that the selection of the notification means is left to the notification managing apparatus 1. For example, in the air conditioning device 15, the "urgency" is set to a low value in report of completion of processing designated by the user and set to a high value when abnormality of car room temperature is detected.

The notification content indicates a content that should be communicated by the notification. When an amount of information of this notification content is small, it is possible to attain an object of the notification content with simple notification (e.g., flashing of the head light 33a). However, when an amount of information, which should be warned of, is large, it is necessary to use notification means (e.g., the indirect communication device 12) that is capable of providing more detailed information.

If it is necessary to designate the notification means on the notifying processing unit side, for example, when a contact destination at the time of occurrence of abnormality is designated, a notification request D2 shown in the figure only has to be used. This notification request D2 indicates that there is designation of the notification means with the item "notification means designated". In addition, the notification request D2 designates notification timing, notification means, and notification content.

Therefore, when the notification-request receiving unit 23 receives the notification request D2, the notification-means selecting unit 24 notifies the designated content at the designated notification timing and with the designated notification means. Note that, when the notification means is designated on the notification processing unit side, it is also possible that the respective in-vehicle devices directly control the respective notification means without the intervention of the communication control device 1.

Figure 3:
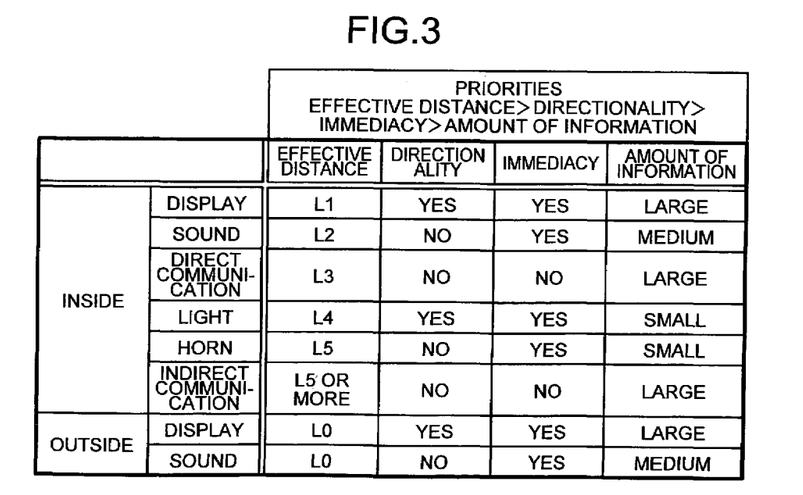
FIG. 3 is a table for explaining characteristics of respective notification means.

FIG. 3 is a table for explaining characteristics of respective notification means. The respective notification means are different in an effective distance, directionality, immediacy, and an amount of information that can be notified to the person.

First, the effective range of notification is longer in an order of display using the outside display 32c, sound notification using the outside speaker 32b, direct communication using the direct communication device 14, notification by light using the lighting system 33, and notification by notification sound using the horn 32a. The effective distances are represented as "L0"<"L1"<"L2"<"L3"<"L4"<"L5".

The notification by the indirect communication device 12 is not restricted by a distance. Notification by display using the inside display 31a and sound notification using the inside speaker 31b are effectively only for a user in a car.

Concerning the directionality of notification, the display using the outside display 32c, the notification by light using the lighting system 33, and the notification by display using the inside display 31a are effective only when a user is looking at the notification means.

On the other hand, the sound notification using the outside speaker 32b, the direct communication using the direct communication device 14, the notification by notification sound using the horn 32a, the notification by the indirect communication device 12, and the sound notification using the inside speaker 31b have no directionality. Thus, the notification is effective regardless of directions of the notification means with respect to a user in the effective distance.

Concerning the immediacy of notification, in the direct communication using the direct communication device 14 and the notification by the indirect communication device 12, communication content is recognized at a point when a user checks a terminal. On the other hand, since the other notification means can cause the user to recognize the terminals simultaneously with execution of notification, the other notification means have high immediacy.

Concerning the amount of information that can be warned of, in the notification by light using the lighting system 33 and the notification by notification sound using the horn 32a, since information is warned of by a simple pattern, the amount of information is small. In comparison with this, in the sound notification using the outside speaker 32b and the sound notification using the inside speaker 31b, since a notification content can be explained in words, an amount of information is large.

In the display using the outside display 32c, the notification by display using the inside display 31a, the direct communication using the direct communication device 14, and the notification by the indirect communication device 12, it is possible to notify a larger amount of information.

The notification-means selecting unit 24 acquires the location and the direction of the user, the urgency of notification, and the amount of information of the notification content and selects optimum notification means based on the characteristics of the respective notification means.

Specifically, it is possible to calculate a distance from the user to the vehicle according to image processing from a photographing result of the outside camera 13. If a terminal held by the user and the direct communication device 14 are capable of communicating with each other, it is seen that the user is within an effective distance of direct communication.

It is also possible to judge the direction of the user from the photographing result of the outside camera 13. When a moving direction of the user can be detected by the direct communication or the like, it is possible to assume a direction of the user from the moving direction. In other words, when the user is approaching the vehicle, it is possible to assume that the user faces in the direction of the vehicle and, when the user is moving away from the vehicle, it is possible to assume that the user does not face in the direction of the vehicle.

Figure 4:
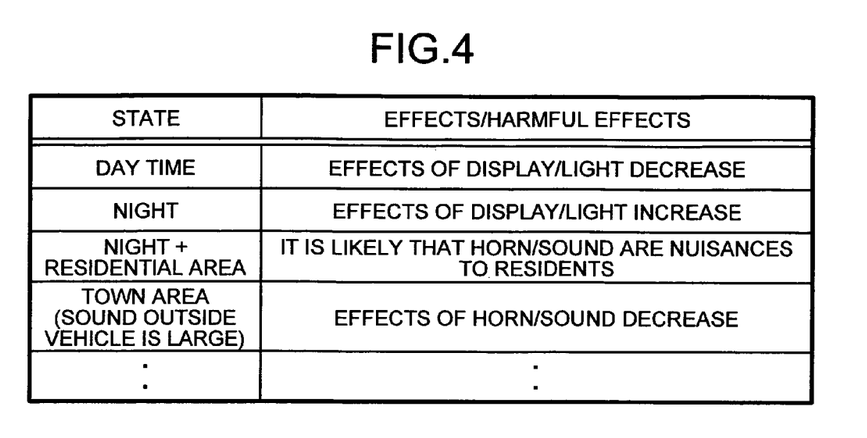

The effectiveness of the notification means changes according to time, a situation around a vehicle, and the like. For example, as shown in FIG. 4, the effects of the notification by display and light decrease during the daytime (when it is bright around the vehicle) and the effects of the notification by display and light increase at night (when it is dark around the vehicle).

In a residential area or the like at night, it is likely that the notification by horn 32 and the outside speaker 32b is a nuisance to residents. On the other hand, when it is noisy around the vehicle in a town area or the like, the effects of the notification by the horn 32a and the outside speaker 32b decrease.

Thus, the notification-means selecting unit 24 selects notification means suitable for the situation around a vehicle using the location information of the own vehicle and the time information acquired by the situation acquiring unit 21 from the navigation device 2. Note that, although the location information and the time information are used here, information usable as the situation around the vehicle is not limited to these kinds of information. It is possible to use various kinds of information for judgment of the situation around the vehicle by, for example, directly detecting brightness around the vehicle and directly acquiring sounds outside the vehicle. As a priority of the respective parameters, the parameters are set in the order of "effective distance">"directionality">"immediacy">"amount of information". However, the priorities may be changed appropriately.

Figure 5:
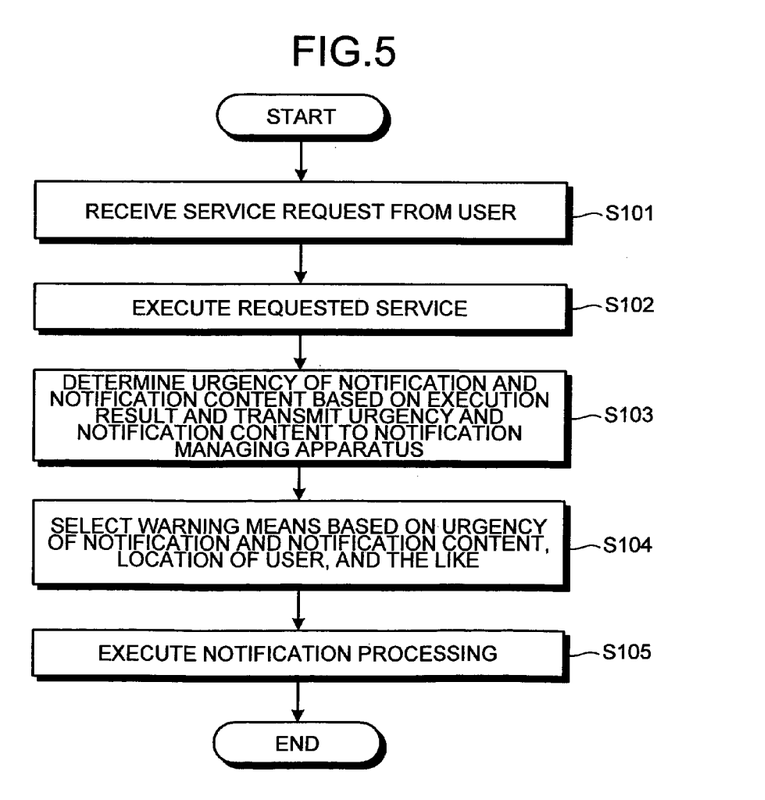
FIG. 5 is a flowchart of a processing operation of the in-vehicle system.

FIG. 5 is a flowchart of a processing operation of the in-vehicle system. The in-vehicle device such as the air conditioning device 15, the fire preventing device 16, or the battery managing device 17 receives a service request from a user (step S101) and executes the requested service (step S102).

As a result, if notification is necessary, the in-vehicle device determines urgency of the notification and a notification content and transmits the urgency and the notification content to the notification managing apparatus 1 (step S103).

The notification managing apparatus 1 selects notification means based on the received urgency of the notification and the received notification content, a location of the user, and the like (step S104), executes notification processing by the selected notification means (step S105), and ends the processing.

Figure 6:
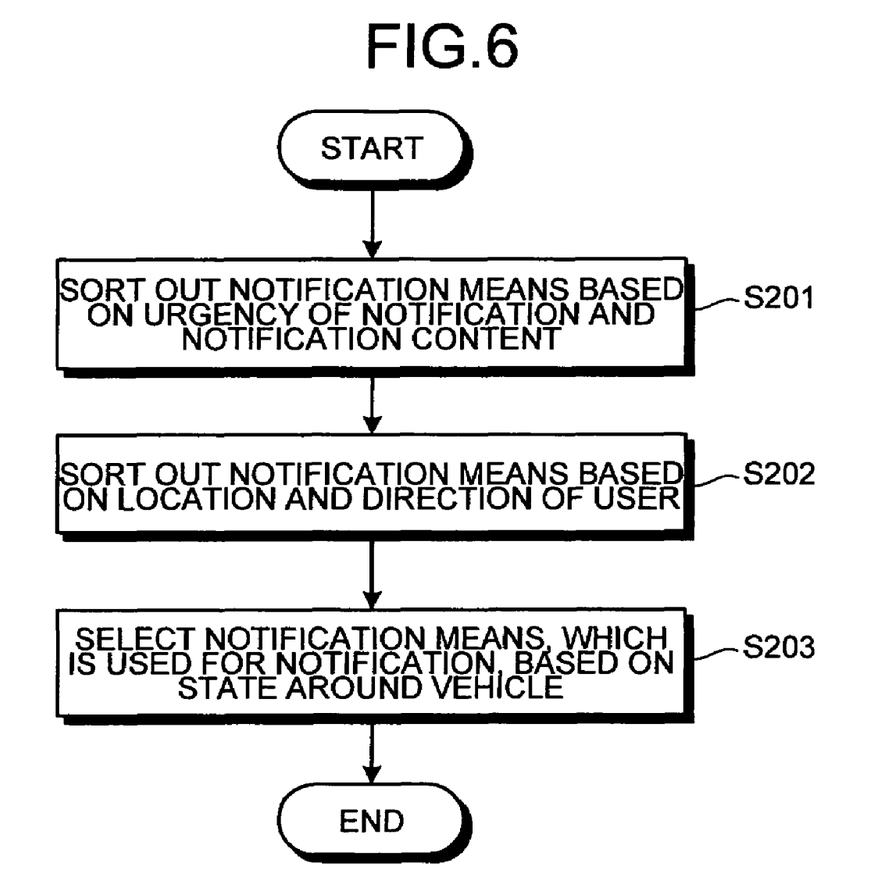
FIG. 6 is a flowchart of selection processing for the notification means.

FIG. 6 is a flowchart of selection processing for the notification means. The notification-means selecting unit 24 sorts out notification means based on the urgency of the notification and the notification content (an amount of information) (step S201). At the same time, the notification-means selecting unit 24 sorts out notification means based on the location and the direction of the user (step S202).

As a result, all the remaining notification means are capable of attaining the purpose of notification. Thus, the notification-means selecting unit 24 determines notification means, which is used for notification, based on situations around the vehicle (the time information and the location information of the vehicle).

In this way, the notification managing apparatus 1 receives notification requests including the urgency and the notification content from the various in-vehicle devices and selects notification means, which is used for notification, based on the characteristics of the respective notification means. This makes it possible to realize notification conforming to situations around the user and the vehicle.

Note that notification means to be selected does not always have to be independent and plural notification means may be used in combination. For example, when notification with a high urgency and a large amount of information is performed while a user is near the vehicle, it is possible to transmit detailed information to a terminal held by the user according to the direct communication and facilitate check of the terminal according to the notification with high immediacy such as a horn.

In addition, in the explanation of the flowchart shown in FIG. 5, the in-vehicle device starts the processing in response to a request from the user. However, it is needless to mention that the same processing flow is also applicable when the in-vehicle device executes the processing automatically and judges necessity of notification.

Figure 7:
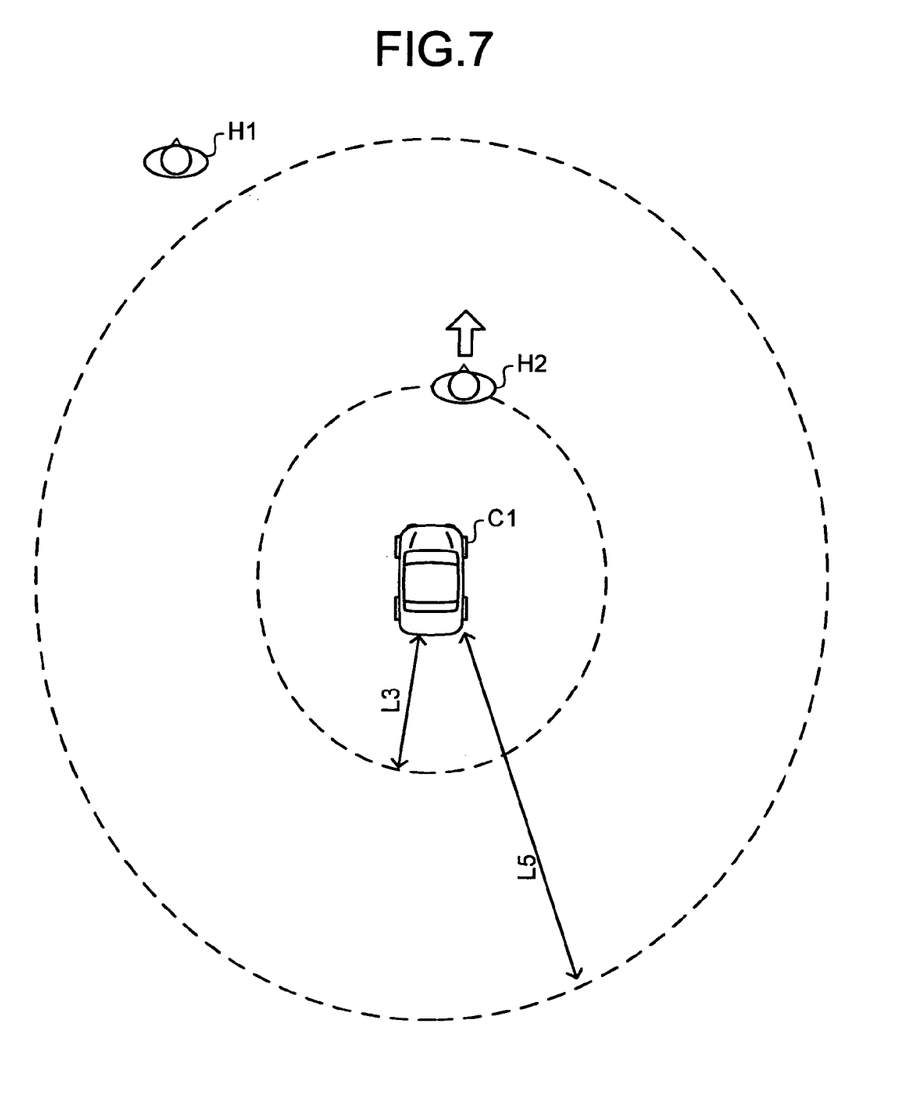
FIG. 7 is a schematic for illustrating a specific example of an operation of the in-vehicle system.

FIG. 7 is a schematic for illustrating a specific example of an operation of the in-vehicle system. To learn a position relation between an own vehicle C1 and a user, an area for detecting a distance is set. The area is set by a radio wave or the like of a proximity sensor, image processing of a camera, or the like.

In this situation, for example, when a battery voltage falls drastically, urgency is large because of the drastic fall. The notification content is, for example, "a battery voltage is falling rapidly. Please take measures". An amount of information is a medium level.

Since a location of the user cannot be detected by the proximity sensor or the camera, a distance between the vehicle and the user is L5 or more. Since a direction of the user cannot be detected by the proximity sensor or the camera, the direction of the user is unknown. Time is assumed to be the night.

Figure 8A:
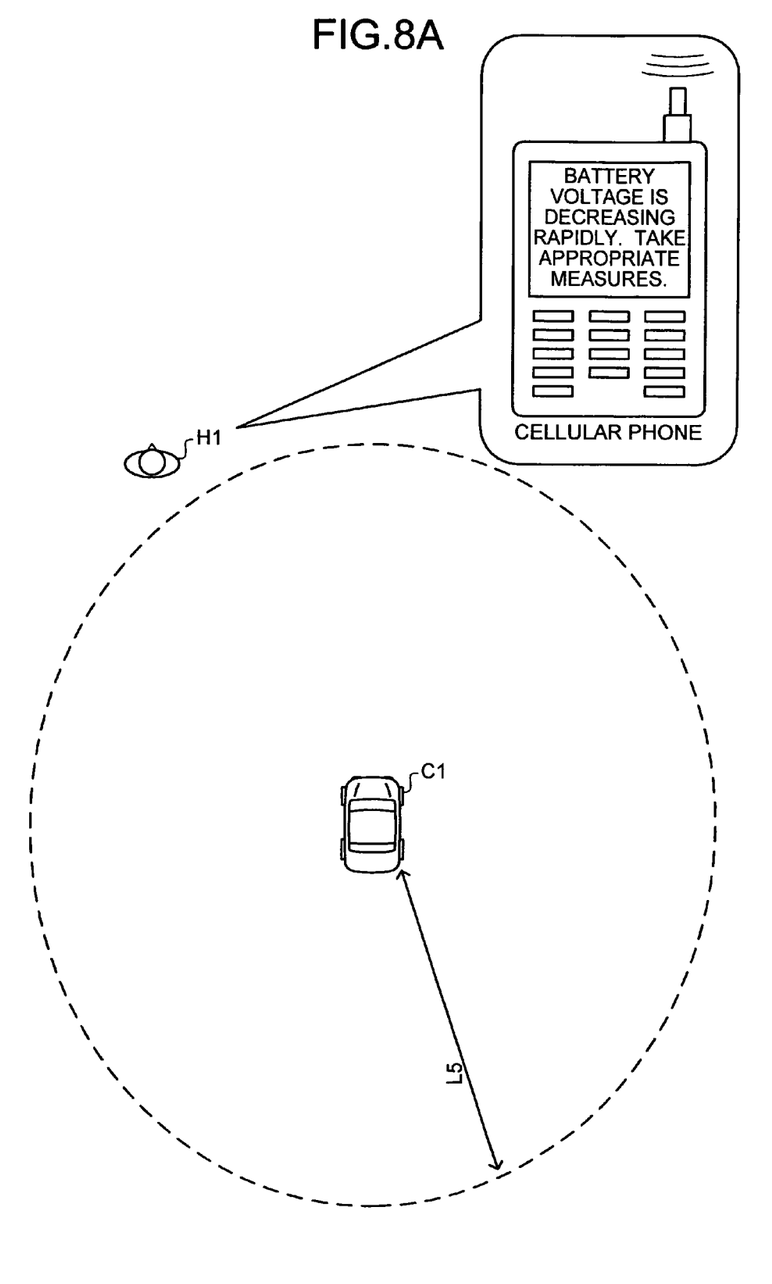
FIG. 8A is a schematic for illustrating a usage of "indirect communication" as the notification means.

Therefore, in this situation (the user location H1), a choice of notification means is "indirect communication" because the distance is L5 or more. When it is assumed that a highest priority is given to a distance, since the choice is one, the indirect communication is selected as the notification means regardless of the other parameters (directionality, etc.) and notification is performed by a cellular phone (FIG. 8A).

In this situation, for example, when a battery voltage falls drastically, urgency is large because of the drastic fall. The notification content is, for example, "a battery voltage is falling rapidly. Please take measures". An amount of information is a medium level.

A location of the user is detected as L3 by the proximity sensor or the camera. A direction of the user is detected as a direction opposite to a direction of the own vehicle C1 by the proximity sensor or the camera. Time is assumed to be the night.

Figure 8B:
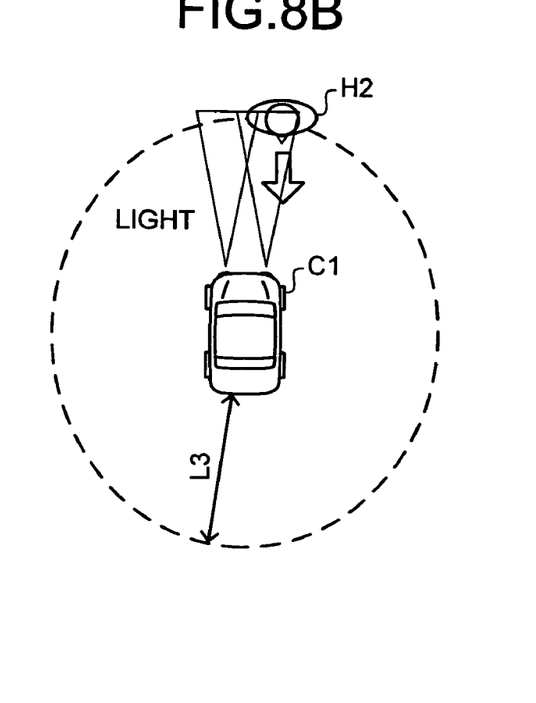
FIG. 8B is a schematic for illustrating a usage of "light" as the notification means.

Therefore, in this situation (the user location H2), since the distance is L3, choices of notification means are "direct communication", "light", "horn", and "indirect communication". When it is assumed that the next priority is given to the directionality, since the user faces in a direction opposite to a direction of the own vehicle C1, the choices of notification means are narrowed down to "direct communication", "horn", and "indirect communication". (When the user faces in the direction of the own vehicle C1, "light" is selected because the user can be visually recognized by the in-vehicle device (FIG. 8B).

Figure 8C:
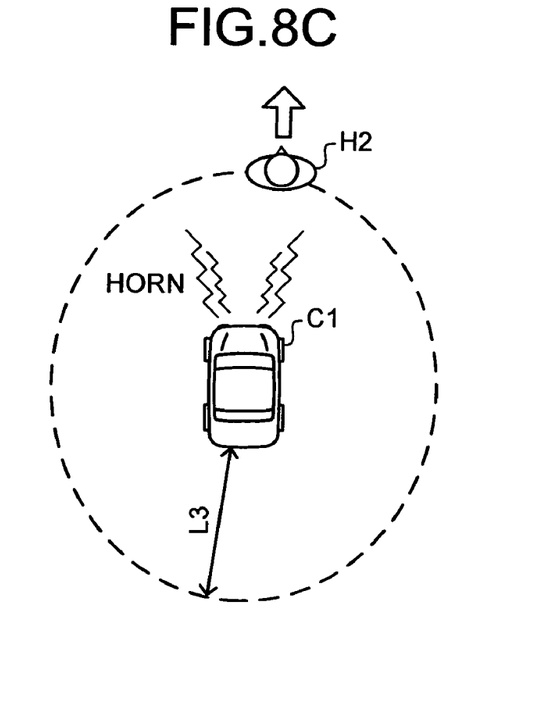
FIG. 8C is a schematic for illustrating a usage of a "horn" as the notification means.

When the next priority is given to the immediacy, "horn" is selected as notification means because the urgency is high (FIG. 8C). This is because time is the night and, although notification by the horn is likely to be a nuisance, the priority of the urgency is high.

Figure 8D:
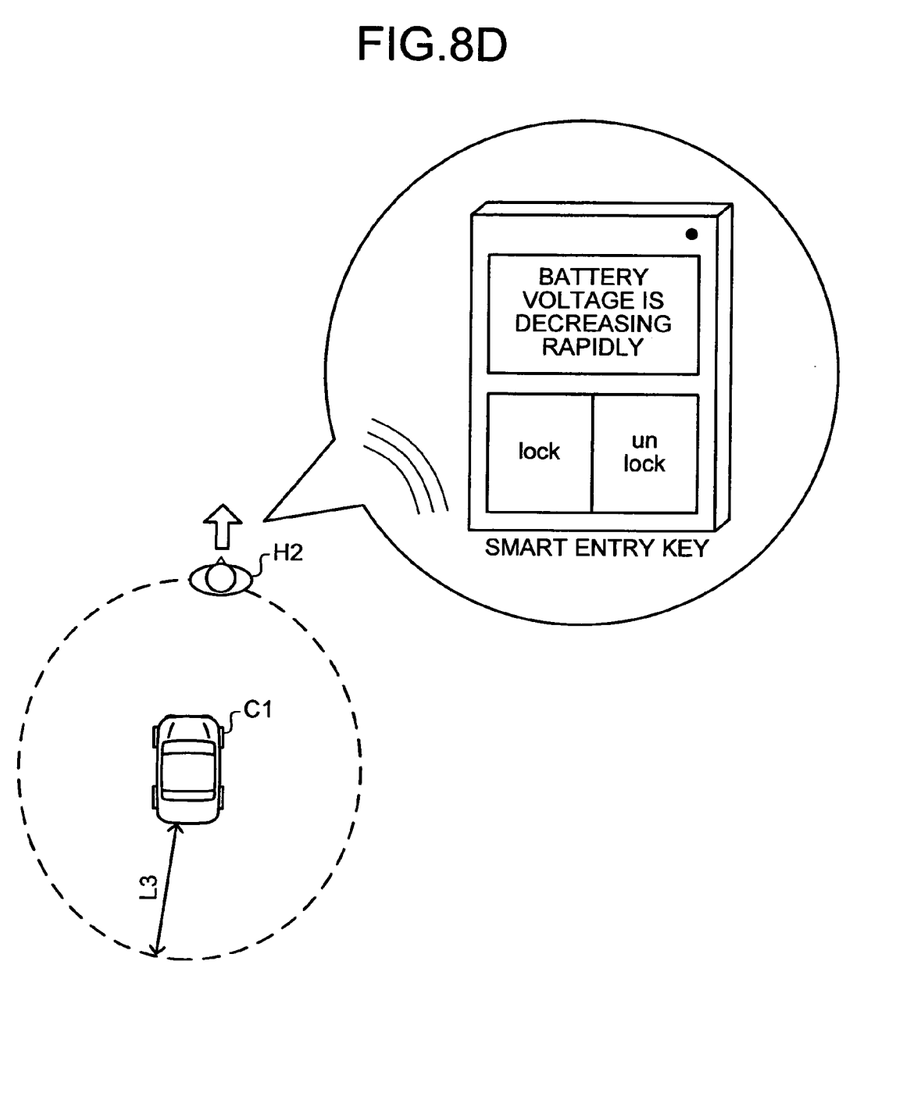
FIG. 8D is a schematic for illustrating a usage of "direct communication" as the notification means.

The amount of information is medium and a sufficient amount of information cannot be obtained only by notification by the horn. Thus, in this case, character display by the direct communication is performed simultaneously with the notification by the horn (FIG. 8D). Alternatively, an outside speaker may be adopted as the horn to warn with sounds.

When a smart entry key does not have a character display function, notification is displayed on a cellular phone or the like by the indirect communication. When a battery voltage is extremely low, it is also possible that usage of the horn with large power consumption is avoided and notification is performed only by the direct communication.

In this way, priorities are set for the respective parameters and the notification means are selected in an order of the priorities. Note that, although a direction of the user with respect to the own vehicle is detected here, it may be judged whether the user faces in the direction of the in-vehicle device.

In detecting a direction of the user, it is possible to use the following methods. A method of photographing the user with a camera and subjecting a photograph to image processing to judge whether a line of sight is directed to the own vehicle. A method of judging, according to radio intensity of the smart entry key, that the user faces in the direction of the own vehicle when the user is approaching the own vehicle (radio wave intensity is gradually increasing) and that the user does not face in the direction of the own vehicle when the user is moving away (radio wave intensity is gradually decreasing). A method of judging that the user is approaching the own vehicle and faces in the direction of the own vehicle when a door is unlocked and that the user does not face in the direction of the own vehicle when the door is locked. By adopting such methods, it is possible to warn the user efficiently compared with random notification such as selection of all the notification means.

The in-vehicle system shown in FIG. 1 includes the notification managing apparatus that integrally processes selection of the notification means. However, the application of the present invention is not limited this. For example, the respective in-vehicle devices may select the notification means, respectively.

Figure 9:
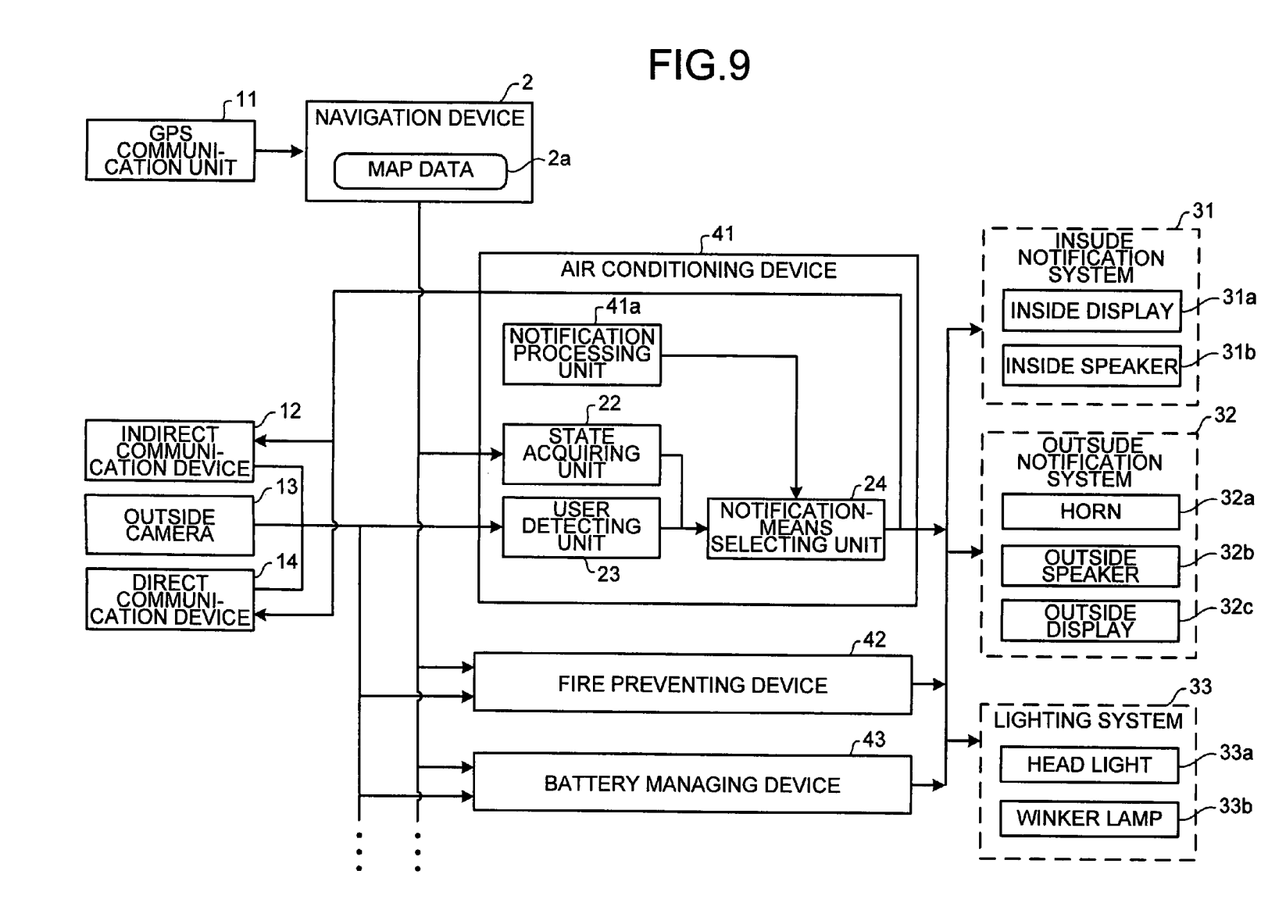
FIG. 9 is a block diagram of an in-vehicle system in which each of in-vehicle devices selects notification means.

FIG. 9 is a block diagram of an in-vehicle system in which each of in-vehicle devices selects notification means. An air conditioning device 41 has the situation acquiring unit 21, the user detecting unit 22, and the notification-means selecting unit 24 in addition to a notification processing unit 41a.

The situation acquiring unit 21, the user detecting unit 22, and the notification-means selecting unit 24 function in the same manner as those shown in FIG. 1. Therefore, when necessity of notification arises, the air conditioning device 41 can select notification means, which should be used, based on urgency of the notification and a content of the notification.

Similarly, a fire preventing device and a battery managing device 43 include situation acquiring units, user detecting units, and notification-means selecting units and are capable of executing selection of notification means.

Therefore, according to this constitution, the respective in-vehicle devices can select notification means, respectively, and share a selection logic of the notification means. Thus, it is possible to reduce development and manufacturing cost.

As described above, when notification is necessary, the in-vehicle system according to the present embodiment selects appropriate notification means based on urgency of notification, an amount of information of a notification content, a distance to a user and a direction of the user, and a situation around a vehicle. Thus, it is possible to execute notification conforming to the situation and the notification content.

Note that inside devices like a seat belt and a steering provided in a car may be used as the notification means explained above. When the seat belt is used as the notification means, it is possible to use a tightening operation by the belt for notification. It is possible to vibrate the steering to thereby cause the steering to function as notification means. Note that, according to the present embodiment, a person to be notified is explained as the "user" who uses a vehicle. However, the person to be notified is not limited to this and may be fellow passengers or other registered people.

According to the present invention, it is possible to obtain a notification management device that executes notification conforming to a location of a person to be notified.

Moreover, according to the present invention, it is possible to obtain a notification managing apparatus that executes notification conforming to a location and a direction of a person to be notified.

Furthermore, according to the present invention, it is possible to obtain a notification managing apparatus that executes notification conforming to urgency and an amount of information.

Moreover, according to the present invention, it is possible to obtain a notification managing apparatus that selects appropriate notification means based on a situation and executes notification.

Furthermore, according to the present invention, it is possible to obtain a notification managing apparatus that selects various notifying devices mounted on a vehicle according to a situation.

Moreover, according to the present invention, it is possible to obtain a notification managing apparatus that executes notification through a network when a location of a person to be notified is distant from the vehicle.

Furthermore, according to the present invention; it is possible to obtain a communication managing device that sends notification to a person to be notified using a direct communication unit according to a situation.

Moreover, according to the present invention, it is possible to obtain a notification managing apparatus that simply measures a distance to a person to be notified and selects appropriate notification means.

Furthermore, according to the present invention, it is possible to obtain a notification managing unit that simply specifies a distance to a person to be notified and a direction of the person to be notified and selects appropriate notification means.

Moreover, according to the present invention, it is possible to obtain a notification managing apparatus that executes notification conforming to a location of a vehicle and the time.

Furthermore, according to the present invention, it is possible to obtain a notification managing apparatus that executes notification conforming to a location, a direction, and a situation of a person to be notified.

Moreover, according to the present invention, it is possible to obtain a notification managing apparatus that executes notification conforming to a distance to a person to be notified from a vehicle.

Furthermore, according to the present invention, it is possible to obtain a notification managing apparatus that executes notification conforming to a direction of a person to be notified.

Moreover, according to the present invention, it is possible to obtain a notification managing method that executes notification conforming to a location of a person to be notified.

Furthermore, according to the present invention, it is possible to obtain a notification managing method of executing notification conforming to a location and a direction of a person to be notified.

Moreover, according to the present invention, it is possible to obtain a notification managing method of executing notification conforming to urgency and an amount of information.

Furthermore, according to the present invention, it is possible to obtain a notification managing method of selecting appropriate notification means based on a situation and executing notification.

Moreover, according to the present invention, it is possible to obtain a notification managing method of selecting various notifying device mounted on a vehicle according to a situation.

Furthermore, according to the present invention, it is possible to obtain a notification managing method of simply measuring a distance to a person to be notified and selecting appropriate notification means.

Moreover, according to the present invention, it is possible to obtain a notification managing method of simply specifying a distance to a person to be notified and a direction of the person to be notified and selecting appropriate notification means.

Furthermore, according to the present invention, it is possible to obtain a notification managing method of performing notification conforming to a location of a vehicle and time.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. An apparatus for managing a notification from an in-vehicle device of a vehicle to a person to be notified, the apparatus comprising:
   a notification-request receiving unit that receives a notification request from the in-vehicle device:
   an information acquiring unit that acquires information on the person, the information including at least a relative position of the person with respect to the vehicle; and
   a means selecting unit that selects from a plurality of notification means each having different characteristics based on the information acquired and urgency of the notification request and an amount of information that should be in the notification request.

2. The apparatus according to claim 1, wherein the information further includes a direction of the person with respect to the vehicle.

3. The apparatus according to claim 1, wherein the characteristics include one or more of effective distance, directionality, immediacy of the notification means, and amounts of information that can be included in the notification by the notification means.

4. The apparatus according to claim 3, wherein the plurality of notification means includes at least one of an alarm device, an in-vehicle lighting device, an in-vehicle communication unit, a sound output unit, a display unit, and one or more other in-vehicle devices.

5. The apparatus according to claim 4, wherein the in-vehicle communication unit includes an indirect communication unit that performs a communication via a network.

6. The apparatus according to claim 4, wherein the in-vehicle communication unit includes a direct communication unit that directly communicates with a communication terminal.

7. The apparatus according to claim 6, wherein the information acquiring unit measures a distance between the person and the vehicle using the direct communication unit.

8. An apparatus for managing a notification from an in-vehicle device of a vehicle to a person to be notified, the apparatus comprising:
   an information acquiring unit that acquires information on the person, the information including at least a relative position of the person with respect to the vehicle;
   a means selecting unit that selects from a plurality of notification means each having different characteristics based on the information acquired; and
   an imaging unit that takes an image around the vehicle, wherein
   the information acquiring unit identifies from the image at least one of a distance between the person and the vehicle, and a direction of the person.

9. The apparatus according to claim 1, further comprising a situation acquiring unit that acquires at least one of time information and location information of the vehicle, wherein
   the means selecting unit selects the notification means using the at least one of time information and location information.

10. An apparatus for managing a notification from an in-vehicle; device of a vehicle to a person to be notified, the apparatus comprising:
    an information acquiring unit that acquires information on the person, the information including at least a relative position and a direction of the person with respect to the vehicle;
    a situation acquiring unit that acquires at least one of time information and location information of the vehicle; and
    a priority setting unit that sets a priority among the relative position of the person with respect to the vehicle, the direction of the person with respect to the vehicle, and the at least one of time information and location information, wherein
    means selecting unit that selects from a plurality of notification means each having different characteristic based on the priority.

11. An apparatus for managing a notification from an in-vehicle device of a vehicle to a person to be notified, the apparatus comprising:
    an information acquiring unit that acquires information on the person, the information including at least a relative position of the person with respect to the vehicle;
    an area setting unit that sets an area within which the person can recognize the notification from the in-vehicle device; and
    an imaging unit that takes an image around the vehicle, wherein the information acquiring unit identifies from the image at least one of a distance between the personal and the vehicle and a direction of the person.

12. A method of managing a notification from an in-vehicle device of a vehicle to a person to be notified, the method comprising:
    receiving a notification request from the in-vehicle device;
    acquiring information on the person, the information including at least a relative position of the person with respect to the vehicle; and
    selecting from a plurality of notification means each having different characteristics based on the information acquired and urgency of the notification request and an amount of information that should be in the notification request.

13. The method according to claim 12, wherein the information further includes a direction of the person with respect to the vehicle.

14. The method according to claim 12, wherein the characteristics include one or more of effective distance, directionality, immediacy of the notification means, and amounts of information that can be included in the notification by the notification means.

15. The method according to claim 14, wherein the plurality of notification means includes at least one of an alarm device, an in-vehicle lighting device, an in-vehicle communication unit, a sound output unit, a display unit, and one or more other in-vehicle devices.

16. The method according to claim 12, wherein the acquiring includes measuring a distance between the person and the vehicle via a communication with a communication terminal held by the person.

17. A method of managing a notification from an in-vehicle device of a vehicle to a person to be notified, the method comprising:
    acquiring information on the person, the information including at least a relative position of the person with respect to the vehicle;
    selecting from a plurality of notification means each having different characteristics based on the information acquired; and
    taking an image around the vehicle, wherein
    the acquiring includes identifying at least one of a distance between the person and the vehicle and a direction of the person from the image.

18. The method according to claim 12, further comprising acquiring at least one of time information and location information of the vehicle, wherein
    the selecting includes selecting the notification means using the at least one of time information and location information.

* * * * *